United States Patent [19]

Partus

[11] 4,235,829
[45] Nov. 25, 1980

[54] VAPOR DELIVERY SYSTEM AND METHOD OF MAINTAINING A CONSTANT LEVEL OF LIQUID THEREIN

[75] Inventor: Fred P. Partus, Cobb County, Ga.

[73] Assignee: Western Electric Company, Inc., New York, N.Y.

[21] Appl. No.: 36,714

[22] Filed: May 7, 1979

[51] Int. Cl.³ .............................................. B01F 3/04
[52] U.S. Cl. ................................ 261/121 R; 137/209; 137/386; 137/392
[58] Field of Search ............... 137/159, 392, 386, 209, 137/210; 261/121 R

[56] References Cited

U.S. PATENT DOCUMENTS

| | | | |
|---|---|---|---|
| 836,511 | 11/1906 | Rochefoucavld et al. | 137/157 |
| 2,438,733 | 3/1948 | Yorke | 137/68 |
| 2,756,765 | 7/1956 | Agule et al. | 137/386 |
| 2,825,104 | 3/1958 | Jones | 137/209 |
| 3,035,888 | 5/1962 | Massey | 137/209 |
| 3,324,870 | 6/1967 | Guerin | 137/82 |
| 3,446,222 | 5/1969 | Barker | 137/392 |
| 3,461,031 | 8/1969 | Reitzel | 137/209 |
| 3,596,673 | 8/1971 | Laucournet | 137/392 |
| 3,645,292 | 2/1972 | Schoger | 137/599.1 |
| 3,797,514 | 3/1974 | Byers | 137/392 |
| 3,826,560 | 7/1974 | Schultz | 350/96 WG |
| 4,047,655 | 9/1977 | McCafferty | 137/386 |
| 4,148,334 | 4/1979 | Richards | 137/389 |

FOREIGN PATENT DOCUMENTS 1250648   9/1967   Fed. Rep. of Germany ........... 137/386

OTHER PUBLICATIONS

Dull, "Modern Physics", 1945, p. 34.

Primary Examiner—Tim R. Miles
Attorney, Agent, or Firm—Robert B. Kennedy

[57] ABSTRACT

A vapor delivery system is disclosed comprising a bubbler 12 is adapted to generate and deliver vapors from a vaporizable liquid contained therein, and a reservoir 30 in fluid communication with the bubbler 12 from which liquid may be continuously fed into the bubbler to replenish liquid vaporized within and withdrawn from the bubbler. The system further comprises means for sensing the level of vaporizable liquid in the bubbler and means for providing a gaseous head pressure in the reservoir of variable magnitude dependent upon the level of vaporizable liquid sensed by the sensing means to maintain the level of liquid in the bubbler substantially constant.

10 Claims, 1 Drawing Figure

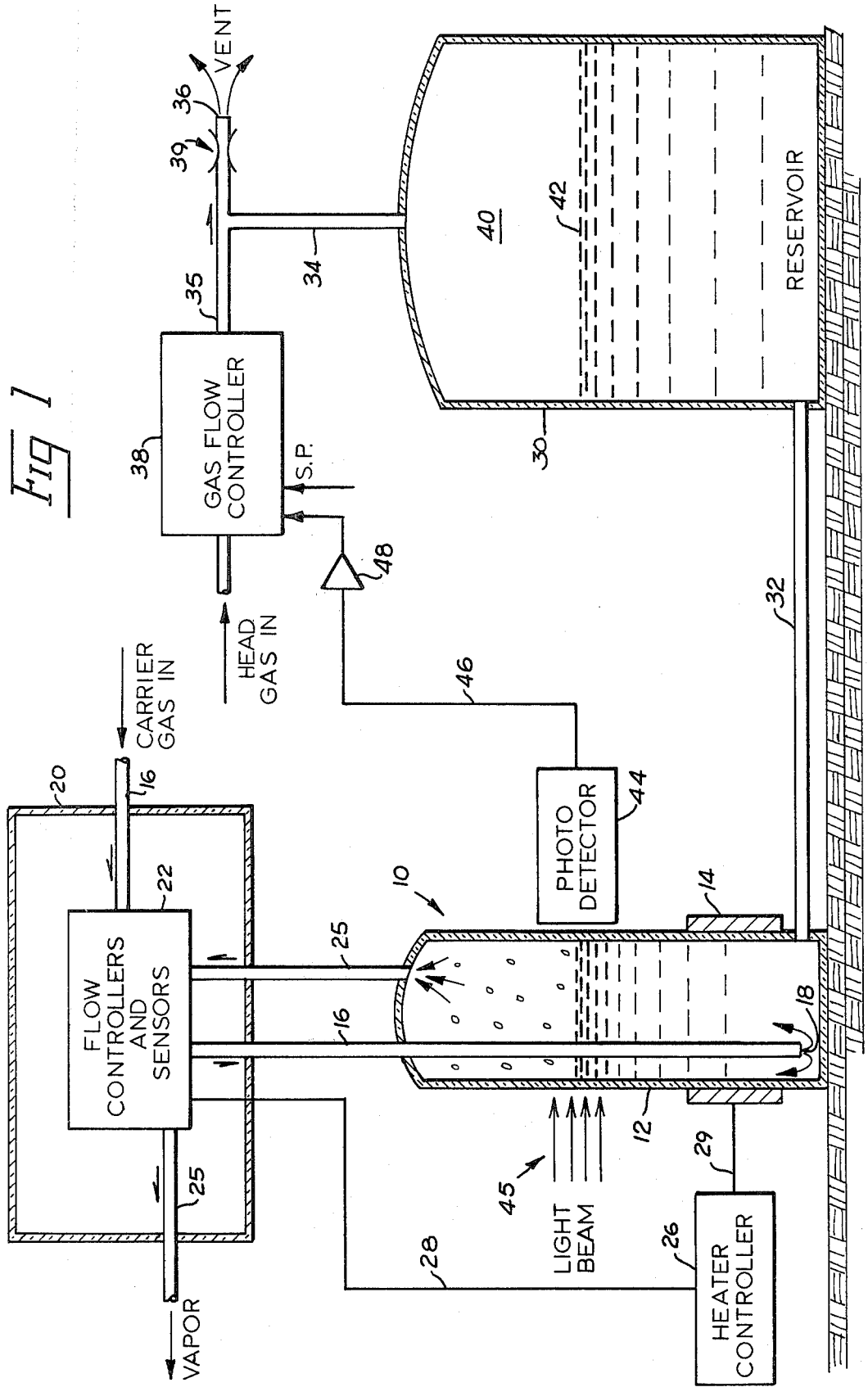

VAPOR DELIVERY SYSTEM AND METHOD OF MAINTAINING A CONSTANT LEVEL OF LIQUID THEREIN

TECHNICAL FIELD

This invention relates to vapor delivery systems of the type employing bubblers and to methods of maintaining constant levels of liquid within bubblers.

BACKGROUND OF THE INVENTION

With the advent of optical waveguides for use in the telecommunications industry, much emphasis has recently been placed on vapor deposition as a materials forming technique. In constructing preforms from which optical fibers may be drawn, vapors of materials such as $SiCl_4$, $SeCl_4$, and $PoCl_3$ must be precisely blended and delivered at controlled mass flow rates to a preform construction site where they are reacted and deposited on or within a support. This can be done by passing carrier gases such as $H_2$, $He$, $N_2$, $O_2$, or $Ar$ through supplies of the materials in liquid form to the deposition site with the vapors entrained with the carrier gas. In performing this operation a group of vaporizors is normally used of the type known as bubblers.

A bubbler has a chamber in which a gas intake conduit terminates with an outlet orifice located below the surface of liquid contained therein. An outlet conduit communicates between the space above the surface of the liquid and the vapor deposition site. Exemplary of deposition systems employing bubblers is that illustrated in U.S. Pat. No. 3,826,560.

Since vapors of the liquid housed within a bubbler are intermittently or continuously being withdrawn during bubbler operation, the level of liquid descends unless replenished from an auxiliary source. In some applications such decreases in the level of liquid within the bubbler would have little effect. In other applications, however, such as in vapor deposition procedures employed in constructing optical fiber preforms, significant variations in the level of liquid have a pronouncely adverse effect. This is attributible to the fact that the rate of vaporization is not solely dependent upon the surface area of liquid within the bubbler which area can, of course, be maintained constant as by the use of cylindrically shaped vessels. The vaporization rate here however is also dependent upon several other factors including the flow characteristics of carrier gas bubbled through the liquid. For example, the size of the bubbles as they rise through the liquid has an effect on the rate of vaporization. The rate of flow of the carrier gas introduced into the bubble itself has another effect on the rate of vaporization as also does the rise time of the bubbles which, of course, depends on the depth at which they are introduced. The rate of heat transfer into the bubbler will also be effected by changes in the level of liquid. While theoretically possible to program a heater controller to account for these variables as changes in the level of liquid are continuously monitored, that approach is complex and fails to eliminate the need for some degree of level control to prevent complete depletion or flooding.

Accordingly, it is to the task of maintaining a substantial constant level of liquid within a bubbler while vapors from the liquid are being continuously or intermittantly withdrawn to which the present invention is generally directed. More particularly, the invention is directed to level control systems and methods for use in vaporizing highly corrosive liquids such as halogens which are used in constructing optical fiber preforms and which may easily become contaminated if brought into direct contact with materials of the type used in conventional level controllers such as floats and the like.

SUMMARY OF THE INVENTION

In one form of the invention a vapor delivery system is provided which comprises a bubbler adapted to generate and to deliver vapors from a vaporizable liquid contained therein, and a reservoir in fluid communication with the bubbler from which liquid may be continuously fed into the bubbler to replenish liquid vaporized within and withdrawn from the bubbler. The system further comprises means for sensing the level of vaporizable liquid contained within the bubbler and means for providing gaseous head pressures in the reservoir of magnitudes dependent upon the level of vaporizable liquids sensed by the sensing means.

In another form of the invention a vapor delivery system is provided which comprises a bubbler adapted to generate and to deliver vapors from a vaporizable liquid contained therein, and a reservoir in fluid communication with the bubbler from which liquid may be continuously fed into the bubbler to replenish liquid vaporized within and withdrawn from the bubbler. The system further includes means for providing a gaseous head pressure within the reservoir, means for determining the level of vaporizable liquid contained within the bubbler, and means for altering the gaseous head pressure in the reservoir to maintain a selected level of vaporizable liquid within the bubbler subtantially constant as liquid is vaporized and withdrawn from the bubbler.

In yet another form of the invention a method is provided for maintaining a constant level of liquid within a bubbler while vapors of the liquid are being withdrawn. The method comprises the steps of providing a reservoir of liquid in fluid communication with a bubbler and a gaseous head pressure within the reservoir, sensing deviations of the actual level of liquid within the bubbler from a selected level, and varying the gaseous head pressure within the reservoir to sensed deviations of the actual liquid level within the bubbler from the selected level to maintain the actual level substantially at the selected level.

BRIEF DESCRIPTION OF THE DRAWING

FIG. 1 is a schematic diagram of a vapor delivery system embodying principles of the invention in one preferred form which system may be used in practicing a method of the invention.

DETAILED DESCRIPTION

Referring now in more detail to the drawing, there is shown a vapor delivery system comprising a vaporizor 10 in the form of a bubbler 12 having a resistance heater 14 jacketed about the exterior surface of the bubbler. A carrier gas intake conduit 16 extends from an unshown source of pressurized gas laterally into a temperature controlled chamber 20 and through a flow controller and sensor unit 22. After passing through the unit 22 the conduit is directed downwardly out of the bottom of the enclosure 22 and into the bubbler termianting with a lower outlet or orifice 18 located adjacent the bottom of the bubbler. A vapor stream conduit 25 extends upwardly from an intake orifice located adjacent the top of the bubbler 12 into the heat controlled enclosure 20, through the flow controllers and sensors unit 22 where it junctures with other, unshown vapor stream conduits from other bubblers of similar type, and then out of the enclosure to a vapor deposition site. The flow controller and sensors unit itself is electrically coupled to a heater controller 26 by a control signal line 28. A load line 29 extends from the heater controller to the resistance heater 14 jacketed about the bubbler 12.

A reservoir 30 is provided with a conduit 32 in continuous fluid communication between lower portions of the reservoir and bubbler. The reservoir is constructed to have a capacity several orders of magnitude greater than that of the bubbler. The reservoir 30, bubbler 12 and conduit 32 are each constructed of glass such as Pyrex. A gas intake line 34 extends upwardly from the top of the reservoir to juncture with another gas line 35. The gas line 35 itself extends from an unshown supply of pressurized gas of a composition which may be the same as that of the selected carrier gas that is bubbled through the bubbler to a vent 36 through a gas flow controller 38. The gas flow controller, which may be a Fluid Controller Model No. 260 sold by the Tylan Corporation of Torrance, Calif., serves to regulate the flow rate of gas through conduit 35. An orifice or choke 39 is located between the juncture of lines 34 and 35 and vent 36. With this construction a head pressure is established in the space 40 within the reservoir above the surface 42 of liquid housed therein which may be altered by changes in flow rate through line 35 effected by the gas flow controller 38.

A photodetector 44 is mounted adjacent the exterior of the bubbler 12 at a level selected for liquid contained within the bubbler. A light beam 45 is directed along a horizontal path at this selected liquid level onto the photodetector passing through the transparent glass walls of the bubbler. Since here a portion of the light beam passes through the liquid while another passes above its surface, and thus through less dense matter, the amount of light impinging upon the photoconductor is dependent upon the liquid level. Should the actual level rise above the selected level less light impinges upon the photodetector since a greater portion of the beam passes through and is scattered by the liquid. Conversely, should the actual level decline from the selected level a greater portion of the beam will pass through the less dense space above the liquid causing a greater amount of light to strike the photodetector. In this manner it is seen that the amount of light detected by the photodetector is dependent upon the actual level of the liquid.

The electrical signal generated by the photodetector therefore is functionally related to the level of the liquid. This signal is fed through the control signal line 46 and an amplifier 48 to the gas flow controller where the previously mentioned Tylan Flow Controller sensor signal is normally fed to the controller comparitor. In this matter the flow of gas through the conduit 35, and thus the magnitude of the head pressure within space 40 of the reservoir, is functionally related to the actual level of liquid within the bubbler as sensed by the photodetector. If desired, adjustments may be made to the flow controller on an intermittent basis responsive to manual observation of the level of liquid in the bubbler rather than by the automated means described. In either event the quantity and level of liquid in the bubbler is caused to remain constant by accompanying decreases in the quantity and level of liquid in the reservoir with increases in reservoir head pressure as liquid is withdrawn from the system.

It should be understood that the just described embodiments merely illustrate principles of the invention in selected, preferred forms. Many modifications, additions and deletions may, of course, be made thereto without departure from the spirit and scope of the invention as set forth in the following claims.

What is claimed is:

1. A vapor delivery system comprising a reservoir; a bubbler adapted to generate and deliver vapors from a vaporizable liquid contained therein; conduit means providing bidirectional flow of liquid between said reservoir and bubbler; means for sensing the level of vaporizable liquid contained within said bubbler; and means for providing a gaseous head pressure in said reservoir of variable magnitudes dependent upon the level of vaporizable liquid sensed by said sensing means to maintain the level of liquid in the bubbler substantially constant.

2. A vapor delivery system in accordance with claim 1 wherein at least a portion of the wall of said bubbler is permeable to the passage of light, and wherein said liquid level sensing means comprises a photodetector mounted adjacent the exterior of said light permeable portion of said bubbler wall, and means for directing a beam of light along a generally horizontal path through said bubbler towards said photodetector.

3. A vapor delivery system in accordance with claim 2 wherein said means for providing a gaseous head pressure of variable magnitudes within said reservoir comprises a conduit in fluid communication with said reservoir through which pressurized gas may be directed, and means operatively coupled with said photodetector for controlling the rate of flow of gas through said conduit.

4. A vapor delivery system in accordance with claim 1 wherein the fluid capacity of said reservoir is substantially greater than the fluid capacity of said bubbler.

5. A vapor delivery system in accordance with claim 1 wherein said means for determining the level of vaporizable liquid contained within said bubbler comprises a window in a wall of said bubbler through which the liquid level may be observed.

6. A vapor delivery system comprising a reservoir; a bubbler adapted to generate and deliver vapors from a vaporizable liquid contained therein which includes means for introducing and bubbling a carrier gas upwardly through the contained liquid; conduit means for providing bilateral transfers of liquid between said reservoir and said bubbler; means for providing a gaseous head pressure within said reservoir; means for determining the level of vaporizable liquid contained within said bubbler; and means for altering the gaseous head pressure in said reservoir to maintain a selected level of vaporizable liquid within said bubbler substantially constant as liquid is vaporized and withdrawn from said bubbler and as the rates vary at which the carrier gas is introduced into the bubbler and bubbled upwardly through the liquid contained therein.

7. A vapor delivery system in accordance with claim 5 wherein said means for providing a gaseous head pressure within said reservoir includes a conduit in fluid communication with said reservoir through which pressurized gas may be directed, and wherein said means for altering the gaseous head pressure includes means for controlling the rate of flow of gas through said conduit operatively coupled with said level determining means.

8. A vapor delivery system in accordance with claim 5 wherein the fluid capacity of said reservoir is substantially greater than the fluid capacity of said bubbler.

9. A method of maintaining a substantially constant level of liquid within a bubbler while vapors of the liquid are being withdrawn, and with the method comprising the steps of:

(a) providing a reservoir of liquid in liquid communication with a body of liquid within the bubbler;

(b) providing a gaseous head pressure within the reservoir;

(c) sensing deviations of the actual level of liquid within the bubbler from a selected level; and (d) varying the gaseous head pressure within the reservoir responsive to sensed deviations of the actual liquid level within the bubbler from the selected level to maintain the actual level substantially at the selected level by alternately feeding liquid to or withdrawing liquid from the bubbler.

10. The method of maintaining a substantially constant level of liquid within a bubbler in accordance with claim 9 wherein step (c) a beam of light is directed along the selected liquid level within the bubbler and onto a photodetector whereby the photodetector may generate electrical signals representative of deviations of the actual level of liquid from the selected level.

* * * * *